United States Patent Office 3,402,144
Patented Sept. 17, 1968

3,402,144
ALKALI METAL-CONTAINING
POLYPHENYLENE ETHERS
Allan S. Hay, Schenectady, N.Y., assignor to General
Electric Company, a corporation of New York
No Drawing. Filed Oct. 5, 1967, Ser. No. 673,021
9 Claims. (Cl. 260—47)

ABSTRACT OF THE DISCLOSURE

Polyphenylene ethers are metalated with alkali metal alkyls or aryls to give activated alkali metal-containing polymers. These metalated polymers readily react with chemical reagents to produce modified polymers and also react with anionically polymerizable monomers to produce graft copolymers. Surfaces of fabricated articles, e.g., films, fibers, molded objects, etc., may be modified by this reaction to increase dyeability, wetability, insolubility or other surface properties of the object.

---

This invention relates to metalated polyphenylene ethers and to a process of producing the same. More particularly this invention relates to alkali metal-containing polyphenylene ethers, especially those in which the preponderant repeating unit of the polymer molecule is a 1,4-phenylene ether unit, and to a process of producing the same.

Polyphenylene ethers, as a general class, are an extremely interesting group of new polymers. These polymers and processes of producing them are disclosed in my U.S. Patents 3,306,874 and 3,306,875, and copending application Ser. No. 593,733, filed Nov. 14, 1966. Polymers and copolymers of poly(2,6-dihalophenylene ethers) are disclosed in U.S. Patents 3,256,243, 3,257,357 and 3,257,358. All of the above polyphenylene ethers may be readily halogenated on the phenylene ring by the well known techniques for ring halogenation, e.g., direct halogenation at room temperature or in the presence of a metal halide, for example ferric chloride. A convenient means of monochlorination of polyphenylene ethers is disclosed and claimed in copending application, Ser. No. 613,130, Hall, filed Feb. 1, 1967, and assigned to the same assignee as the present invention and comprises reacting the polyphenylene ethers with phosgene or thionyl chloride and an aryl sulfoxide. This process is a convenient method of preparing poly(2,6-disubstituted phenylene ethers) with chlorine in the meta position of some of the phenylene ether units. These patents and applications are incorporated by reference as to the polyphenylene ethers and means of making the same which can be converted to the metal containing compositions of this invention.

The particular polyphenylene ethers that can be metalated by my process to produce the novel compositions of this invention are those polymers including copolymers, having the formula

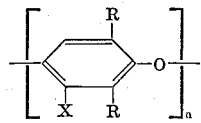

where $n$ is at least 10, X on each phenylene unit of the polymer is independently selected from the group consisting of hydrogen and halogen and each R of each phenylene unit is independently selected from the group consisting of hydrogen, halogen, alkyl free of a tertiary α-carbon atom, including aryl substituted alkyl, and aryl, including alkyl substituted aryl. As disclosed in my U.S. Patent 3,306,875, when the phenols, from which the above polyphenylene ethers are prepared, have halogen or hydrogen in one of the ortho positions, some of the phenylene units of the polymer are joined to the oxygen of the adjacent unit in the polymer molecule through the ortho rather than through the para position shown above. However, means are disclosed in this patent for minimizing the ortho linkages so that the polymer is predominately made of units joined at the para position.

X in the above formula in addition to hydrogen may be any halogen, for example, chlorine, bromine or iodine. If X is halogen, it is preferably chlorine, since it is the cheapest and most readily available halogen. R in the above formula, in addition to being the same as X, may be alkyl free of a tertiary α-carbon atom, including aryl substituted alkyl, examples of which are methyl, ethyl, propyl, isopropyl, butyl, secondary butyl, hexyl, cyclohexyl, heptyl, octyl, decyl, octadecyl, etc., benzyl, phenylethyl, naphthylmethyl, phenylpropyl, tolylmethyl, xylylethyl, etc., aryl including alkyl substituted aryl, examples of which are phenyl, tolyl, xylyl, naphthyl, methylnaphthyl, ethylnaphthyl, ethylphenyl, biphenylyl, terphenylyl, etc. Additional examples of substituents which R may be, are those alkyl substituents free of a tertiary α-carbon atom and aryl substituents disclosed as substituents on the starting phenols and polyphenylene ether products in my above-identified U.S. patents and copending application. In addition to these references, the other previously mentioned patents disclose a wide variety of substituted polyphenylene ethers useful in the making of the metalated polyphenylene ethers of this invention.

These polyphenylene ethers are readily metalated by reacting them with an alkali metal alkyl or alkali metal aryl. Since the alkyl or aryl moiety of the metalating agent does not become a part of the polymer molecule, the paritcular alkyl or aryl moiety of the metalating agent is not important nor critical. Any of the widely known group of alkali metal alkyls or alkali metal aryls may be used as a metalating agent. These alkylating agents have the formula R″—M where R″ is any alkyl or aryl group and M is an alkali metal, e.g., lithium, sodium, potassium, rubidium or cesium, where the alkali metal is bonded directly to the carbon atom of R″. In addition, metalating agents, which incorporate more than one alkali metal atom are known and can likewise be used. For example, styrene and α-methyl styrene readily react with an alkali metal to form a 1,4-diphenylbutane dimer containing an alkali metal atom attached to each of the two aliphatic carbon atoms which are joined to the two phenyl nuclei. These latter compounds have one advantage in that all of the alkali metal used in preparing them is incorporated into the metalating agent whereas only one half of the alkali metal is incorporated in the metalating agents prepared from halides. Also they are soluble in a variety of solvents suitable for the metalating reaction.

The generally available sodium, potassium, rubidium and cesium alkyls and aryls are insoluble solids in contrast to the corresponding lithium compounds which are soluble. Although the insoluble metalating agents can be used for my metalating reaction in a heterogeneous reaction mixture, the reaction is generally slower than for the corresponding reaction for soluble metalating agents which permits the use of a homogeneous solution. When metalating with alkali metals, I prefer to use the metal compounds which are readily soluble in the solvents suitable for the metalation reaction.

The above metalating agents which are formed by a substitution reaction or by addition to a double bond to form a direct carbon-to-metal bond are to be differentiated from the ionic metal adducts of organic compounds containing conjugated double bonds wherein the alkali metal adds to the organic compound by an addition reaction involving an electron transfer from the metal to the organic compound without forming a direct metal-to-carbon bond.

Examples of the latter are the alkali metal adducts of polynuclear aromatics, e.g., biphenyl, naphthalene, anthracene, etc., the alkali metal adducts of diaryl ketones, etc. The reactions of polyphenylene ethers with these adducts are disclosed in my copending applications (Ser. Nos. 637,014 and 672,956) filed concurrently herewith and assigned to the same assignee as the present invention.

The metalating agents of this invention are made by reacting an alkyl halide or dialkyl mercury or a diaryl mercury with an alkali metal thereby forming the particular alkali metal alkyyl or alkali metal aryl and an alkali metal halide or free mercury, the reaction of an alkali metal with styrene, α-methyl styrene, etc., in a solvent, for example, tetrahydrofuran, etc., in the presence of an activating aromatic compound, for example, biphenyl, terphenyl, etc. These and other metalating agents and methods of making them are well known in the art and are disclosed in such books as Organo-Metallic Compounds by G. E. Coates, John Wiley & Sons, New York, second edition (1956). They are extremely sensitive to water, oxygen and carbon dioxide found in air so they must be stored and used in an inert gas atmosphere.

In metalating the above polyphenylene ethers, I can use either one of two general methods. If the polyphenylene ether does not contain a halogen substituent, I may first halogenate the polyphenylene ether to introduce halogen onto the aryl ring. The halogen containing polyphenylene ethers readily react with the metalating agent whereby the alkali metal replaces the halogen in the polyphenylene ether and the halogen forms the halide of the alkyl or aryl moiety of the metalating agent. If desired the amount of metalating agent used can be less than that required to replace all of the halogen of the polyphenylene ether so that the metalated polymer will still contain some phenylene ether units having halogen substituents.

For those polyphenylene ethers not containing halogen, I can react them directly with the metalating agent. This reaction is relatively slow at room temperature, but is hastened by heat, by choice of solvents (tetrahydrofuran, alkyl substituted tetrahydrofurans, ethylene glycol dimethyl ether, etc., are readily available solvents that hasten the reaction) or by the use of tertiary amines as catalysts, especially lower alkylene tertiary diamines, for example, N,N,N',N' - tetramethylethylenediamine, triethylenediamine, etc., hexamethylphosphortriamide, etc. In this reaction, it appears that the alkali metal of the metalating agent first displaces a ring hydrogen of the polyphenylene ether with the alkyl or aryl moiety of the metalating agent forming a hydrocarbon with the hydrogen so displaced. The alkali metal in the ring portion has a strong tendency to transfer to the α-carbon atom of an alkyl substituent if one is present. This is discussed in more detail later.

The reaction is generally carried out in a solution for at least one of the reactants, i.e., the polyphenylene ether or the metalating agent, and the amine catalyst if one is used. Generally, the reaction is much faster if both reactants are in solution in a mutual solvent. The solvent may also serve as a solvent for the metalated polyphenylene ether if desired, but this is not required. Metalation of the polyphenylene ether will occur even though the polyphenylene ether is not dissolved by the solvent. The use of a liquid phase in which the metalating agent is soluble, but the polyphenylene ether is not, is particularly useful when it is desired to metalate only the surface of a shaped article, for example, a fiber, a film or other shaped article made from the polyphenylene ether to modify only the surface properties of such shaped articles by further reaction with reagents reactive with the metal atom of the metalated polymer. By this means it is possible to modify only the surface properties while retaining the bulk properties of the starting polyhenylene ether. This is a very useful technique, for example, when it is desired to change the wetting characteristics, the dyeability or other surface properties of such shaped objects without materially affecting the bulk characteristics of the polymer.

Many of the liquids which are solvents for polyphenylene ethers, for example, benzene, toluene, chloroform, tetrahydrofuran, etc., are themselves reactive with the metalating agent. Chloroform is extremely reactive as would be expected because of its halogen content and should not be used as a solvent for the metalating reaction. However, benzene, toluene, xylene, tetrahydrofuran, etc., are some of the common solvents for the polyphenylene ethers which are much less reactive with the metalating agent than the polyphenylene ether. Therefore, the polyphenylene ethers are preferentially metalated rather than such solvents, although some metalation of the solvent will occur, and it must be compensated for in the amount of metalating agent added to obtain the desired degree of metalation of the polyphenylene ether. Unfortunately, there is no solvent for the polyphenylene ethers which is not somewhat reactive with the metalating agent. However, high degrees of metalation are obtained by use of solvents which dissolve, but do not react with the metalating agent and in which the polyphenylene ether is not soluble. The liquid alkanes, especially the higher boiling ones, are particularly suitable for this heterogeneous reaction.

The desired degree of metalation is determined by the intended use and the desired degree of modification of the polyphenylene ether. However, at least one alkali metal atom should be introduced into each polymer molecule, i.e., one metal atom should be on at least one of the repeating units of each of the polymer molecules. It is possible to obtain polymers in which at least between 80 and 90% of the phenylene ether units have been metalated.

The particular position where metalation of the polymer finally occurs is dependent both on the particular alkali metal of the metalating agent as well as the particular substituents on the phenylene ether units of the polyphenylene ether. If there are no substituents on the phenylene ether unit or the substituents are halogen or aryl, then metalation of the phenylene group will occur, i.e., the alkali metal will be directly bonded to a carbon atom in the phenylene ring of the polymer. If the polyphenylene ether contains an alkyl substituent group free of a tertiary α-carbon atom, metalation appears to occur first on the phenylene nucleus with migration to the α-carbon atom of the alkyl substituent, i.e., to the aliphatic carbon atom directly bonded to the phenylene nucleus. When the polyphenylene ether is metalated with lithium, the degree of migration is much less than occurs with any of the other alkali metals, so that the final product, in the case of lithium, will contain some phenylene ether units in which lithium is on the phenylene nucleus and some phenylene ether units with lithium on the α-carbon atom of the alkyl substituent. The extent of migration is dependent on the temperature and length of metalation reaction period. Longer reaction times and higher temperature favors migration to the α-carbon atom. In the case of the other alkali metals, i.e., sodium, potassium, rubidium and cesium, migration appears to be complete, so that the final metalated product obtained contains these alkali metals all on the α-carbon atom of the alkyl substituent. When there are no alkyl substituents on the polyphenylene ether units, no migration can occur and these alkali metals will be on the phenylene nucleus.

The reaction of the metalating agents occurs at room temperature, especially in the presence of the amine catalyst, but can be carried out up to the reflux temperature of the reaction mixture. Likewise, the reaction can be carried out below ambient temperature if desired. The use of superatmospheric or subatmospheric pressure serves no useful purpose but is not excluded. The reaction is generally over in a matter of minutes for low degrees of metalation, while high degrees of metalation are accomplished in one to two hours. The ratio of metalating agent to polyphenylene ether is not important, it merely being necessary to use a sufficiency of the metalating agent to accomplish the desired degree of metalation. Progress of the reaction can be observed since the viscosity of the solution, if the polymer is in solution, increases as the reaction progresses until finally with high degrees of metalation, the polymer generally will precipitate from solution.

Since both the metalating agent and the metalated polymer are extremely reactive, they should be protected from air. If the metalated polyphenylene ether precipitates from the reaction mixture, it may be separated from the balance of the reaction mixture by centrifugation, filtration, etc., in an inert atmosphere. If the metalated polymer remains in solution, it may be recovered from the balance of the reaction mixture by adding a liquid alkane to the reaction mixture or vice-versa to precipitate the metalated polyphenylene ether which thereafter is recovered by filtration or centrifugation. The metalated polymer is best stored under the surface of a liquid alkane to protect it from the effect of oxygen, carbon dioxide or moisture until it is ready for the use in preparing various derivatives. If the metalated polymer is to be used to prepare other derivatives, it is not necessary to isolate it from the reaction mixture.

From what has been said above, it is apparent that the metalated polyphenylene ethers will still contain the same basic structure as the initial polyphenylene ethers from which the metalated polyphenylene ethers are made, except that some of the phenylene units of the polymer will have an alkali metal substituent either on the carbon atom of the phenylene nucleus or on the α-carbon atom of an alkyl substituent on the polyphenylene nucleus. Other units of the polymer which are not metalated will be the same phenylene ether units occurring in the starting polyphenylene ether. Since the metalated polymers can be either homopolymers or copolymers containing two or more different species of phenylene ether units, the metalated polymers of this invention are best described as metalated polyphenylene ethers whose repeating units have at least one of the formulas A
B
C
and
D

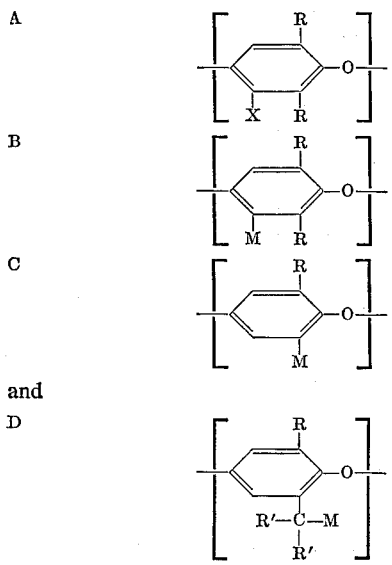

where X is selected from the group consisting of hydrogen and halogen, each R is independently selected from the group consisting of hydrogen, halogen, alkyl free of a tertiary α-carbon atom and aryl, R' is independently selected from the group consisting of hydrogen, alkyl and aryl, and M is an alkali metal with the proviso that M in formulas B and C is lithium when R of the same formulas is alkyl, there being at least one of the metal containing units in the polymer molecule and at least 10 repeating units in the polymer molecule. Any remaining units of the polymer will be polyphenylene units, similar to the above, but joined through the ortho position when R in any of the above formulas which is substituted directly on the phenylene nucleus is hydrogen or halogen. Such units would be only a minor amount of the units present in the polymer. Preferably the polymer is made up of only the units represented by Formulas A, B, C, and D and any alkyl and aryl substituents have no more than 20 carbon atoms. As mentioned previously the particular alkyl or aryl group in the metalating agent has no effect on the metalating reaction nor does it become a substituent on the polyphenylene ether. Because of this and because of their being more readily available, I prefer to use the alkali metal alkyls and aryls where the alkyl and aryl moiety has no more than 20 carbon atoms.

In addition to the metalating reaction described above, secondary reactions also occur which are beneficial to the final products. In the oxidative coupling of phenols to produce polyphenylene ethers, a phenolic hydroxyl group is present on one end of each of the polymer molecules up to the point where the polymers have a number-average molecular weight of about 20,000. As the coupling reaction is continued to produce higher molecular weights, a secondary reaction, the mechanism of which is as yet unknown, causes some of these terminal hydroxyl groups to disappear. Other secondary reactions also occur which produce color in the polymer. Chromophores can be due to amines and/or diphenoquinones absorbed or incorporated in the polymer molecule, carbonyl groups formed on the polymer molecule, etc. I have found that the hydroxyl groups as well as the chromophores react very rapidly with the metalating agent, generally faster than the subject metalation reaction. Subsequent reaction of the metalated polymers with the various reagents used to form derivatives converts the hydroxyl groups to ethers, esters, etc., which end-cap the polymer and converts the chromophores to colorless derivatives.

Generally, chromophores are undesirable in the polymer unless the particular color is desired. Hydroxyl, amino and carbonyl groups generally contribute to thermal degradation of the polymer when exposed to high temperatures. Therefore, the above reaction which eliminates these constituents, is very beneficial. In fact, the subject metalation reaction can be used specifically to obtain only these benefits rather than to form derivatives of the polyphenylene ethers be reacting only that amount of metalating agent required to react with these constituents. This can be done by using one of the above described metalating agents which are deeply colored, i.e., the alkali metal adduct of the styrene dimers

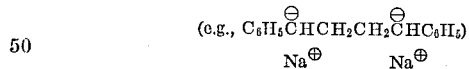

$$(\text{e.g., } C_6H_5\overset{\ominus}{C}HCH_2CH_2\overset{\ominus}{C}HC_6H_5)$$
$$Na^{\oplus} \quad Na^{\oplus}$$

or the colorless metalating agents in conjunction with a compound that reacts extremely rapidly with the colorless metalating agent to produce an intense color as an indicator, i.e., triphenyl methane, etc. By titrating the polymer solution with the metalating agent to the point where the color persists for only a few seconds, the main reaction of the metalating agent will be with the hydroxyl, carbonyl, amine, etc. groups and the chromophores. Continuing the titration to the point where the color persists will result in further metalation of the polymer on the phenylene ring and the alkyl substituents. In all of the following examples both reactions occur. However, since the former reaction occurs on only a very few of the repeating units in each polymer molecular while the latter reaction occurs on a great many of the repeating units of each polymer molecule, the latter reaction predominates and overshadows the former reaction to such an extent that the analytical results and PMR spectra (proton magnetic resonance spectra, sometimes called NMR or nuclear magnetic resonance spectra) are only significant in determining the extent of the latter reaction. Nevertheless, the effect of the former reaction is real, significant and beneficial.

Where only stabilization and decolorization of the polymer is desired with no metalation of the polymer on the phenylene ring or the alkyl substituents, the preferred method is to use an alkali metal adduct of a diaryl ketone as the metalating agent as disclosed and claimed in my copending application Ser. No. 672,956, filed concurrently herewith and assigned to the same assignee as the present invention.

In order that those skilled in the art may better understand my invention, the following examples are given by way of illustration and not by way of limitation. In all of the examples, all parts and percentages are by weight unless stated otherwise.

As mentioned previously, the metalated polyphenylene ethers are extremely reactive. Therefore, in all of the examples, an inert, moisture-free atmosphere was maintained over the reaction mixtures where any metal-organic compound was present and special precautions were taken to dry the solvents used. Also in order to permit analysis of the products to determine the degree of metalation, the metalated polyphenylene ethers were converted to derivatives which not only demonstrate the utility of the metalated polyphenylene ethers, but also produce polymers which can be analyzed by ordinary techniques.

General procedure

Unless stated otherwise, the procedure used was to dissolve the well-dried polyphenylene ether in an anhydrous solvent. The solution of the polymer was placed in a reaction vessel and an inert atmosphere of dry, oxygen-free nitrogen established and then the metalating agent was added. Where used, the butyl lithium was a commercially available 15% solution in n-hexane whose titer was determined by standard techniques. The recited amount is the total amount of solution used. For those reactions carried out at room temperature, the reaction vessel was sealed and periodically shaken during the reaction period. For those reactions carried out at elevated temperature the reaction was carried out in a stirred reactor equipped with a reflux condenser and a flow of dry, oxygen-free nitrogen maintained into the reactor.

Progress of the reaction was followed by the color changes (polymer develops yellow color; if colored, color of metalating agent disappears until excess is present) and by the increase in viscosity of the solution. As the reaction proceeds the viscosity increases and in some cases a gel structure forms. Beyond this point, and especially where a very high degree of metalation is obtained, the metalated polymer precipitates as a powder and the viscosity of the solution decreases.

The metalation reaction was terminated by adding the various reagents recited to produce derivatives that could be readily analyzed. Since the derivative has the substituent groups in the same position and to the same position and to the same extent as the metal atom of the metalated product, the position and extent of metalation which has occurred is identical to the results obtained for the derivative. Progress of this reaction could be followed since the polymer dissolved, if it had precipitated, or the viscosity of the solution decreased as the new product was formed. The color of the metalated polymer also was discharged. Unless stated otherwise, the metalation and subsequent reaction were carried out at ambient temperature.

The product was precipitated by pouring the reaction mixture into methanol containing a small amount of aqueous hydrochloric acid. In the case where chlorosilanes were used to silylate the metalated polymer pure methanol or methanol containing pyridine was used in place of the acidified methanol. The product was purified by redissolving the polymer, generally in chloroform, filtering, and reprecipitating the polymer with methanol. After isolating the product, it was dried, generally in a vacuum at 100° C.

EXAMPLE 1

This example illustrates halogenation of the polyphenylene ether prior to metalation. A solution of 10 g. of poly(2,6 - diphenyl - 1,4 - phenylene ether) in 150 ml. of tetrachloroethane was reacted with 2 g. of bromine at room temperature and heated to reflux. After cooling, the brominated polymer was precipitated by pouring the reaction mixture into methanol and isolated by filtration. The polymer was redissolved in chloroform and reprecipitated and isolated by filtration and dried in vacuum for 6 hours at 140° C. Elemental analyses results were 79.6% carbon, 4.5% hydrogen and 7.7% bromine, showing that there was an average of 0.26% bromines per repeating polymer unit or approximately one bromine for each four repeating phenylene ether units. Stated another way, there was a bromine atom on one out of every four repeating polymer units.

A solution of 7 g. of the above brominated polymer in 150 ml. of benzene and 200 ml. of tetrahydrofuran was reacted with 25 g. of butyl lithium. The reaction mixture became deep red. The reaction was allowed to proceed for 30 minutes at which point 13.3 g. of methyldiphenylchlorosilane [Me($C_6H_5$)$_2$SiCl] which caused the viscosity of the solution to decrease and the color to disappear and introduces methyldiphenylsilyl groups onto the polymer at the sites which had been lithiated. There was obtained 5.8 g. of poly(2,6 - diphenyl - 1,4 - phenylene ether) having methyldiphenylsilyl substituents on some of the phenylene ether repeating units. Elemental analysis showed that the product contained 87.6% carbon, 4.9% hydrogen, 0.02% of bromine and 0.45% silicon. Based on this analysis, approximately one out of every 20 repeating units of the polymer had a methyldiphenylsilyl substituent. This polymer, when molded at 300° C. at 5000 p.s.i. to produce a molded object, flowed more readily and had less tendency to crystallize than the initial polymer. Furthermore, the polymer was readily soluble in sym.-tetrachloroethane at 120° C. and could be used to cast films which crystallized only at the edges. Under the same conditions, the entire film of the original polymer readily crystallized.

EXAMPLE 2

This example illustrates the direct metalation of the polymer without necessity of forming an intermediate halogen derivative. A solution of 10 g. of poly(2,6-diphenyl - 1,4 - phenylene ether) in 700 ml. of benzene was heated to reflux and 14.7 g. of butyl lithium added. After 30 minutes, 7.8 g. of methyldiphenylchlorosilane was added and refluxing continued for an additional one hour. The reaction solution was diluted with 50 ml. of tetrahydrofuran and the polymer isolated as described in the general procedure. There was obtained 7.8 g. of poly-(2,6-diphenyl - 1,4 - phenylene ether) having methyldiphenylsilyl substituents thereon. Elemental analysis showed that the product contained 88.1% carbon, 5.0% hydrogen, 2.8% silicon which corresponds to an average of about one methyldiphenylsilyl group on one out of every three repeating 2,6 - diphenyl - 1,4 - phenylene ether units.

EXAMPLE 3

To a solution of 3 g. of poly(2,6-diphenyl-1,4-phenylene ether) in 100 ml. of tetrahydrofuran, 5.4 g. of butyl lithium was added and allowed to stand for one hour. At the end of this time, the deep red color of the solution had become a very light red and 6 g. of methyldiphenylchlorosilane was added. After approximately 90 minutes, the polymer was isolated. There was obtained 3 g. of the same polymer as obtained in Example 2 except that the polymer had an elemental analysis of 84.5% carbon, 4.7% hydrogen and 3.4% silicon showing that there was approximately one methyldiphenylsilyl group on one out of every two repeating 2,6-diphenyl-1,4-phenylene ether units.

When this example was repeated, but the metalated polymer was reacted with an excess of solid carbon dioxide suspended in 500 ml. of ether instead of the methyldiphenylchlorosilane, there was obtained 2.6 g. of polymer which contained carboxyl groups and, therefore, was an ion exchange resin. The polymer contained 81.9% carbon and 4.9% hydrogen and had a neutralization equivalent (ion exchange capacity) of 2.15 milliequivalents per gram. There was one carboxyl group on approximately 3 out of every 5 polymer units.

When this reaction was repeated, but the lithiated polymer reacted with 6.24 g. of iodine there was obtained polymer which had an analysis of 75.0% carbon, 4.0% hydrogen and 4.3% iodine. Iodine had been introduced into approximately one out of each eight polymer units.

EXAMPLE 4

A solution of 5 g. of poly(2,6-dimethyl-1,4-phenylene ether) in 100 ml. of benzene and 25 ml. of tetrahydrofuran was prepared and reacted with 36 g. of butyl lithium for one hour and then poured into 500 ml. of ether containing an excess of solid carbon dioxide. Analysis of the isolated polymer showed that it contains 65.4% carbon, and 5.2% hydrogen and had a neutralization equivalent of 5.23 meq. per gram showing that there was an average of 0.8 carboxyl group for each repeating 2,6-dimethyl-1,4-phenylene ether unit or approximately four carboxyl groups on every five polymer units.

When this experiment was repeated using only half of the amount of the butyl lithium, the polymer had a neutralization equivalent of 2.29 showing that there was an average of 0.3 carboxyl groups per polymer repeating unit or approximately 1 out of every 3 polymer units had a carboxyl group.

The following examples illustrate some of the effects of solvents, temperature, catalysts and reaction time on the metalation reaction, both as to the extent of the metalation (as determined by the percent of phenylene ether units having new substituent groups on the repeating polymer units) and the extent of metalation of the aryl ring of the phenylene ether compared to the extent of metalation on the α-carbon atom of the alkyl substituent on the aryl ring.

EXAMPLE 5

A solution of 5 g. of poly(2,6-dimethyl-1,4-phenylene ether) in 150 ml. of benzene and 25 ml. of tetrahydrofuran was reacted with 18 g. of butyl lithium. After 3 hours, 7 g. of dimethyl sulphate was added to convert the lithium atoms introduced into the polymer molecule to methyl groups. A yield of 4.4 g. of polymer was obtained having methyl groups substituted on the polymer. The PMR spectrum showed methyl groups had been substituted on 79% of the 2,6-dimethyl-1,4-phenylene ether units or an average of one methyl group on about four out of every five repeating units. This percentage was composed of methyl groups which had been substituted on the aromatic ring of 34% of the polymer units and on one of the methyl groups of 45% of the polymer units. In the latter case the original methyl group was now an ethyl group.

EXAMPLE 6

To demonstrate the accelerating effect of an alkylenediamine and the fact that a shorter metalation time favors metalation of the aromatic ring. Example 5 was repeated with 5 g. of polymer dissolved in 150 ml. of benzene containing 6.2 ml. of N,N,N',N'-tetramethylethylenediamine and the reaction with the 18 g. of butyl lithium terminated at the end of 30 minutes with 7 g. of dimethyl sulphate. There was obtained 4.5 g. of methylated polymer whose PMR spectrum showed methyl groups had been introduced on 74% of the polymer units composed of one methyl group on 37% of the aromatic rings, two methyl groups on 8% of the aromatic rings, and one methyl group on one of the methyl side chains of 29% of the polymer units.

EXAMPLE 7

To demonstrate the effect of elevated temperature, Example 5 was repeated except the metalation reaction was carried out at the reflux temperature of benzene for 15 minutes prior to reacting with the dimethyl sulphate. The polymer had methyl groups introduced onto 31% of the repeating units composed of 7% on the aromatic ring and 24% on one of the methyl groups.

EXAMPLE 8

To demonstrate the effect of lowering the temperature of the metalation reaction, Example 5 was repeated except cooling the reaction mixture in an ice bath and using a reaction time of 75 minutes prior to the addition of the dimethyl sulphate. The PMR spectrum of the methylated polymer showed that methyl groups had been introduced onto 66% of the polymer units composed of one methyl group on 36% of the aromatic rings, two methyl groups on 4.5% of the aromatic rings and one methyl group on the methyl side chain of 21% of the polymer units.

EXAMPLE 9

Other amines which I have used to replace N,N,N',N'-tetramethylenediamine used above, are triethylenediamine, N,N,N',N'-tetraamylethylenediamine, bismorpholinoethane, and N-methyl-N,N',N'-triethylethylenediamine. These amines are extremely active as catalysts for the metalation reaction. Even at room temperature, under the conditions of Example 6, the metalated polymer precipitated almost as soon as the butyl lithium is added when N-methyl-N,N',N'-triethylethylenediamine is used, in about 10 minutes when bismorpholinoethane was used and within about 20 minutes when N,N,N'N'-tetraamylethylenediamine was used.

Another active catalyst is hexamethylphosphortriamide (HMP). A solution of 1 g. of poly(2,6-dimethyl-1,4-phenylene ether) in 50 ml. of benzene and 3.92 ml. of HMP was reacted with 5.1 ml. of a 1.62 N solution of butyl lithium in hexane. The metalated polymer precipitated in 15 seconds. At the end of 30 seconds, 2 ml. of trimethylchlorosilane was added. After isolation, there was obtained 1.9 g. of the polymer whose PMR spectrum showed that it contained trimethylsilyl groups on 6% of the aromatic rings and trimethylsilyl groups on the methyl side chains of 26% of the repeating units of the polymer.

Those tertiary diamines which have from 2 to 4 carbon atoms between the two amino groups are extremely active catalysts. However, they are quite expensive. An example illustrating how a relatively low cost tertiary amine, which has little if any catalytic properties itself, can be used to replace a major part of the more expensive diamines is illustrated by the following example.

EXAMPLE 10

A solution of 5 g. of poly(2,6-dimethyl-1,4-phenylene ether) in 150 ml. of benzene containing 2.5 g. of trimethylamine and 17 g. of butyl lithium was allowed to stand overnight under a nitrogen atmosphere. A light yellow color had developed in the solution but it had not become viscous indicating that the lithiation reaction was proceeding very slowly. At this point, 0.1 ml. of N,N,N',N'-tetramethylethylenediamine was added. The solution immediately became very viscous and metalated polymer precipitated from the solution. After 75 minutes, 4.6 ml. of dimethyl sulphate was added to convert the lithium atoms of the polymer to methyl groups. The PMR spectrum showed methyl groups were on 49% of the repeating polymer units composed of methyl groups on 31% of the aromatic rings and methyl groups on the methyl side chain on 18% of the polymer units.

EXAMPLE 11

One advantage to carrying out the metalating reaction so that the methyl groups are introduced onto the methyl side chain of the polymer units, is that by this means polyphenylene ethers can be prepared containing substituents, which, if present on the phenol which is oxidatively coupled would produce a diphenoquinone rather than the polyphenylene ether. For example, since the metal atom is introduced into the alpha position of an alkyl side chain present on the aryl nucleus, it is possible to convert ethyl groups to isopropyl groups and isopropyl groups to t-butyl groups. For example, I have lithiated poly(2,6-dimethyl-1,4-phenylene ether) which after reacting with dimethyl sulphate converts the lithiated ethyl groups to isopropyl groups. I have also lithiated poly(2-isopropyl-6 methyl-1,4-phenylene ether) to convert the isopropyl groups to t-butyl groups. The steps of reacting with butyl lithium and dimethyl sulphate can be repeated several times to increase the number of groups so converted.

EXAMPLE 12

This example illustrates the use of potassium to metalate poly(2,6-dimethyl-1,4-phenylene ether) and illustrates that, with alkali metals other than lithium, metalation of the alkyl side chain occurs exclusively. To a mixture of 6 g. of finely divided potassium in 5 g. of biphenyl and 130 ml. of tetrahydrofuran there was added over a two-hour period, 16.4 g. of α-methyl styrene. An intense red colored solution was obtained with all of the potassium metal dissolving.

A solution of 10 g. of poly(2,6-dimethyl-1,4-phenylene ether) in 150 ml. of benzene was reacted with 35 ml. of the above red solution. After 15 minutes the solution became extremely viscous and the intense red color of the metalating agent had diminished considerably. After 1 hour at room temperature, 10 g. of dimethyl sulphate was added and the polymer isolated. The PMR spectrum showed that methyl groups had been introduced onto 37% of the polymer units and that all of these methyl groups had been introduced onto the methyl groups initially present in the polymer, i.e., were now ethyl groups. Similar results were obtained by substituting an equivalent amount of sodium for the potassium in the above example.

EXAMPLE 13

This example illustrates the metalation of a polyphenylene ether in a heterogeneous solution in which the metalating agent is not soluble. A solution of 6 g. of poly(2,6-dimethyl-1,4-phenylene ether) in 250 ml. of benzene containing 4 g. of solid potassium metal was heated to 72° C., under a nitrogen atmosphere with vigorous stirring to produce a dispersion of the potassium metal. No reaction occurred between the metal and the polymer solution. After cooling to room temperature, 6 g. of 1-chlorohexane was added over a 30-minute period to produce hexyl potassium in situ. The solution was heated to 65° C., causing the solution to become very dark brown and very viscous. After one hour, 7 g. of dimethyl sulphate was added causing the dark brown color to disappear and the viscosity of the solution to decrease. The polymer was isolated as described in the general procedure. The PMR spectrum of the polymer showed that the methyl groups on 14% of the polymer repeating units had been converted to ethyl groups and 4% to heptyl groups. The heptyl groups had been produced by some of the 1-chlorohexane reacting with the metalated polymer during the metalation reaction, showing that the metalation reaction as well as conversion to derivatives can be carried out simultaneously under those conditions where the agent does not interfere with the metalation of the polymer.

This reaction was repeated except using 2.3 g. of sodium in place of potassium and using toluene instead of benzene so that the dispersion step could be carried out at 100° C. The PMR spectrum of the polymer obtained, showed that the methyl group on 10% of the polymer repeating units had been converted to ethyl groups and 17% to heptyl groups. The PMR spectra of both polymers showed no peak indicating introduction of a methyl or hexyl group in the unsubstituted 3- and 5-position of the phenylene units. Therefore, the metalation with sodium and potassium occurred exclusively on the methyl group. Similar results are obtained when rubidium and cesium are used in place of sodium or potassium.

When poly(2,6-diphenyl-1,4-phenylene ether) is metalated with sodium, potassium, rubidium or cesium as described above, the metal atoms are introduced onto the phenylene ring and not onto the phenyl substituents in the 2- and 6-positions showing that, in an absence of an alkyl substituent on the phenylene ether polymer unit, metalation and a subsequent reaction with reagents which react with the metal atom are introduced exclusively onto the aryl ring of the backbone of the polymer.

EXAMPLE 14

A solution of 1 g. of poly(2,6-diphenyl-1,4-phenylene ether) in 50 ml. of tetrahydrofuran was reacted with 2.5 ml. of a 1.6 N solution of butyl lithium in hexane at 25° C. After 1 hour, the lithiated polymer was reacted with 2 ml. of trimethylchlorosilane to convert the lithium substituents on the polymer to trimethylsilyl substituents. The PMR spectrum of this polymer showed that 24% of the polymer units had a trimethylsilyl group directly attached to the phenylene ring of the polymer.

When this example was repeated except using poly(2-methyl-6-phenyl-1,4-phenylene ether) and increasing the amount of butyl lithium solution to 3.4 ml., the PMR spectrum of the polymer showed that 59.5% of the polymer units had trimethylsilyl groups composed of 24.8% on the phenylene ring and 34.7% on the methyl group of the polymer repeating unit.

EXAMPLE 15

This example illustrates carrying out of the metalation reaction in a heterogeneous solution in which the polymer was not soluble. A suspension of 2 g. of poly(2,6-dimethyl-1,4-phenylene ether) in 100 ml. of cyclohexane containing 2.5 ml. of N,N,N',N',-tetramethylene-ethylene diamine (TMEDA) and 10.26 ml. of a 1.6 N solution of butyl lithium in hexane was allowed to stand for 20 hours at room temperature at which point the solution was divided into two equal portions. One portion (A) was reacted with 2 ml. of trimethylchlorosilane and the other portion (B) was heated for 6 hours at 80° C. before reacting with the same silane. Both polymers were isolated and their PMR spectra obtained. The spectrum of the polymer from the reaction mixture (A) showed that 26% of the repeating units of the polymer contained trimethylsilyl groups composed of 5% where the silyl group was on the phenylene ring and 21% where the silyl group was on the methyl group of the polymer repeating unit. The spectrum of the polymer from the reaction mixture (Z) showed 48% of the repeating units had a trimethylsilyl group, all of which were on the methyl group.

This example was repeated except using poly(2,6-diphenyl-1,4-phenylene ether) in place of the (2-6-dimethyl-1,4-phenylene ether) and reducing the amount of TMEDA to 1.25 ml. and the amount of butyl lithium to 5.1 ml. The reaction mixture was allowed to stand for 120 hours at room temperature before dividing the solution into the two portion. The PMR spectrum of the polymer isolated from the portion which was not heated, showed that 22% of the polymer units had a trimethylsilyl group, all of which were on the phenylene ring. The polymer from the portion which was heated 24 hours at 80° C. was found to have trimethylsilyl groups on 46% of the repeating 2,6-diphenylphenylene ether unit, all of which were on the phenylene ring.

When this example was repeated using poly(1,4-phenylene ether), 3.28 ml. of TMEDA and 13.39 g. of the butyl lithium solution, the polymer isolated from the solution which had been allowed to stand at room temperature for 44 hours at room temperature had a trimethylsilyl group on 4% of the repeating units and the polymer isolated from the reaction mixture which has been heated for additonal 6 hours at 80° C. had a trimethylsilyl group on 8% of the polymer units. Since the initial polyphenylene ether has no substituents on the aryl ring, all of the trimethylsilyl groups had to be on the phenylene ring.

The metalated polyphenylene ethers produced by my process have a wide variety of uses, for example, in preparing the modified polymers as illustrated in the above examples. It is obvious that other active materials may be reacted with the metalated polymers to produce even a wider variety of derivatives for example, the metalated polymers can be reacted with aldehydes, ketones, quinones, carbon dioxide, epoxides, ortho-esters, acetals, ketals, esters, lactones, acyl halides, carboxylic acid anhydrides, nitriles, alkyl halides, alkyl sulphates, organometallic halides, orthosilicate esters, isocyanates, aldimines, phenylhydrazones, nitroso compounds, oxygen, sulphur, disulfides, sulfinates, carbon disulfide, sulfur dioxide, sulfonyl halides, selenium, tellurium, halogens, etc. They are especially useful for making of graft copolymers as disclosed in copending application, Ser. No. 673,022 Bostick et. al., filed concurrently herewith and assigned to the same assignee as the present invention.

Some of the more interesting derivatives that I have prepared are, for example, the reaction of the metalated polymer with Michler's ketone which by oxidation in air or treatment with acid produced an intensely blue-green polymer which now is a polymeric triphenylmethane dye. Another polymeric dye was prepared by the reaction of the metalated polymer with bis(dihydropyranyl) ether of 4,4'-dihydroxybenzophenone which was colorless, but turned red when treated with an acid. The reaction of the metalated poly(1,4-dimethyl-1,4-phenylene ether) with methylundecyl ketone produced a polymer which readily molded at 250° C. while reaction with stearone gave a polymer which melted at less than 100° C. It is quite apparent that the softening temperature of the polyphenylene ethers can be readily altered by means of the metalation reaction and subsequent reaction with various reagents.

Similar results to those obtained in the above examples are obtained with any of the polyphenylene ethers, for example those disclosed and claimed in my above identical patents.

Obviously, other modifications and variations of the present invention are possible in light of the above teachings. It is therefore to be understood that changes may be made in the particular embodiments of the invention described which are within the full intended scope of the invention as defined by the appended claims.

What I claim as new and desire to secure by Letters Patent of the United States is:

1. Metalated polyphenylene ethers whose repeating units have at least one of the formulas A 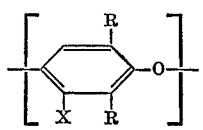

B 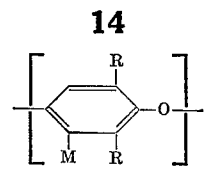

C 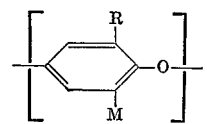

and

D 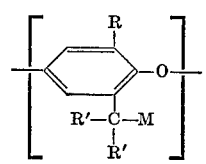

where X is selected from the group consisting of hydrogen and halogen, each R is independently selected from the group consisting of hydrogen, halogen, alkyl free of a tertiary α-carbon atom and aryl, each R' is independently selected from the group consisting of hyrogen, alkyl and aryl, and M is an alkali metal with the proviso that M in formulas B and C is lithium when R of the same formulas is alkyl, there being at least one of the metal containing units in the polymer molecule and at least 10 repeating units in the polymer molecule.

2. The polymers of claim 1 which are metalated poly-(2,6-dimethyl-1,4-phenylene ethers).

3. The polymers of claim 1 which are metalated poly-(2-methyl-6-phenyl-1,4-phenylene ethers).

4. The polymers of claim 1 which metalated poly(2,6-diphenyl-1,4-phenylene ethers).

5. The polymers of claim 1 which are metalated poly-(1,4-phenylene ethers).

6. The polymers of claim 1 which are metalated with lithium.

7. The polymers of claim 1 which are metalated with sodium.

8. The polymers of claim 1 which are metalated with potassium.

9. The process of producing the polymers of claim 1 which comprises reacting (a) a polyphenylene ether having repeating units of formula A, there being at least 10 such units in the polymer molecule, with a metallo hydrocarbon selected from the group consisting of alkali metal alkyls and alkali metal aryls.

No references cited.

WILLIAM H. SHORT, *Primary Examiner.*

M. GOLDSTEIN, *Assistant Examiner.*